Feb. 4, 1941.  A. M. MOBLEY  2,230,331
PLANTING IMPLEMENT OR ATTACHMENT
Filed May 22, 1939  4 Sheets-Sheet 1

Inventor
Arthur M. Mobley
By Baldwin & Wight
his Attorneys

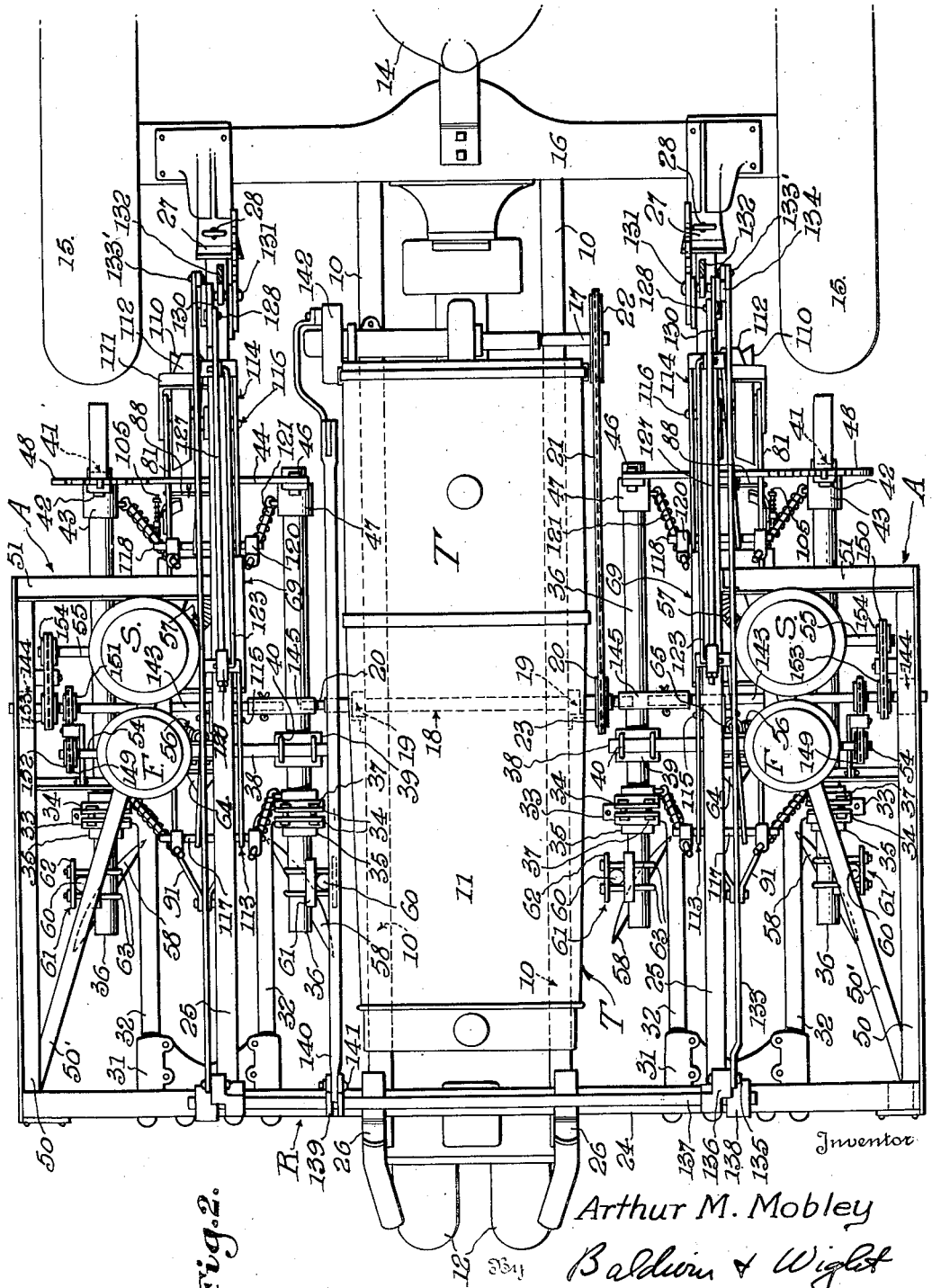

Feb. 4, 1941.   A. M. MOBLEY   2,230,331
PLANTING IMPLEMENT OR ATTACHMENT
Filed May 22, 1939   4 Sheets-Sheet 3
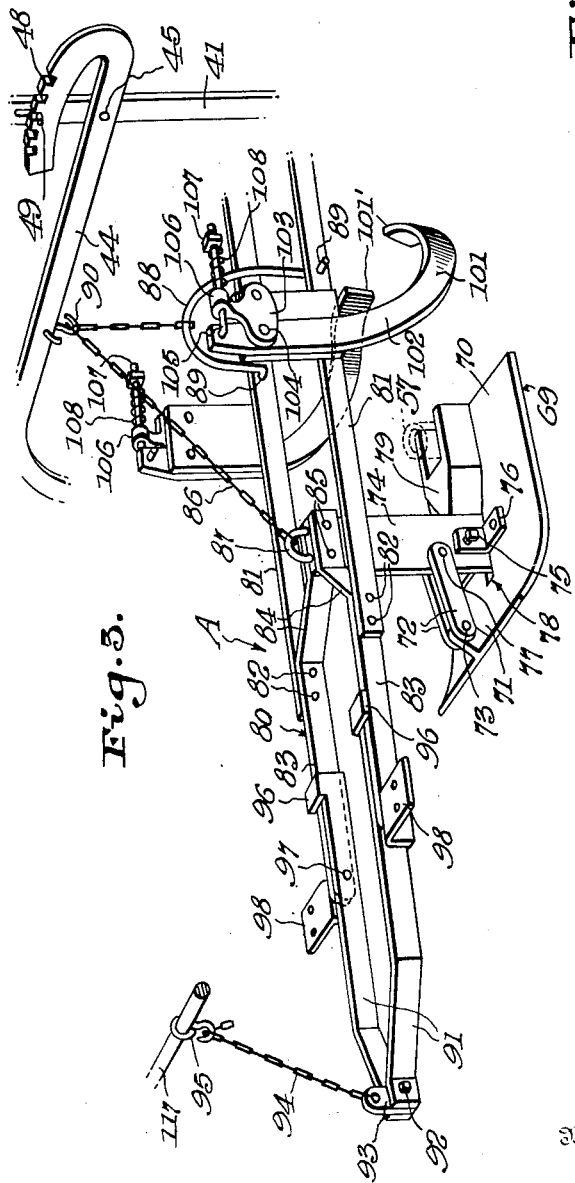
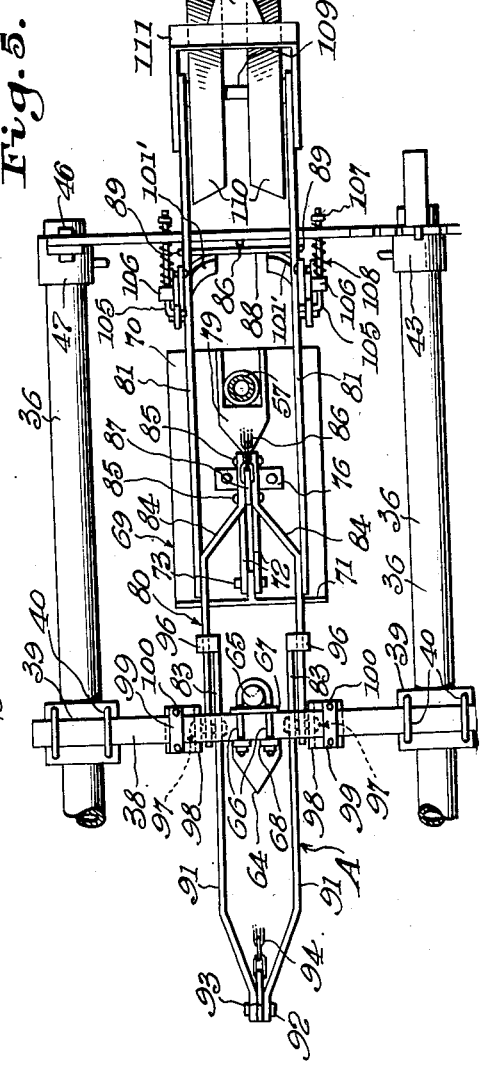
Inventor
Arthur M. Mobley
Baldwin & Wight
his Attorneys Feb. 4, 1941.  A. M. MOBLEY  2,230,331
PLANTING IMPLEMENT OR ATTACHMENT
Filed May 22, 1939      4 Sheets-Sheet 4
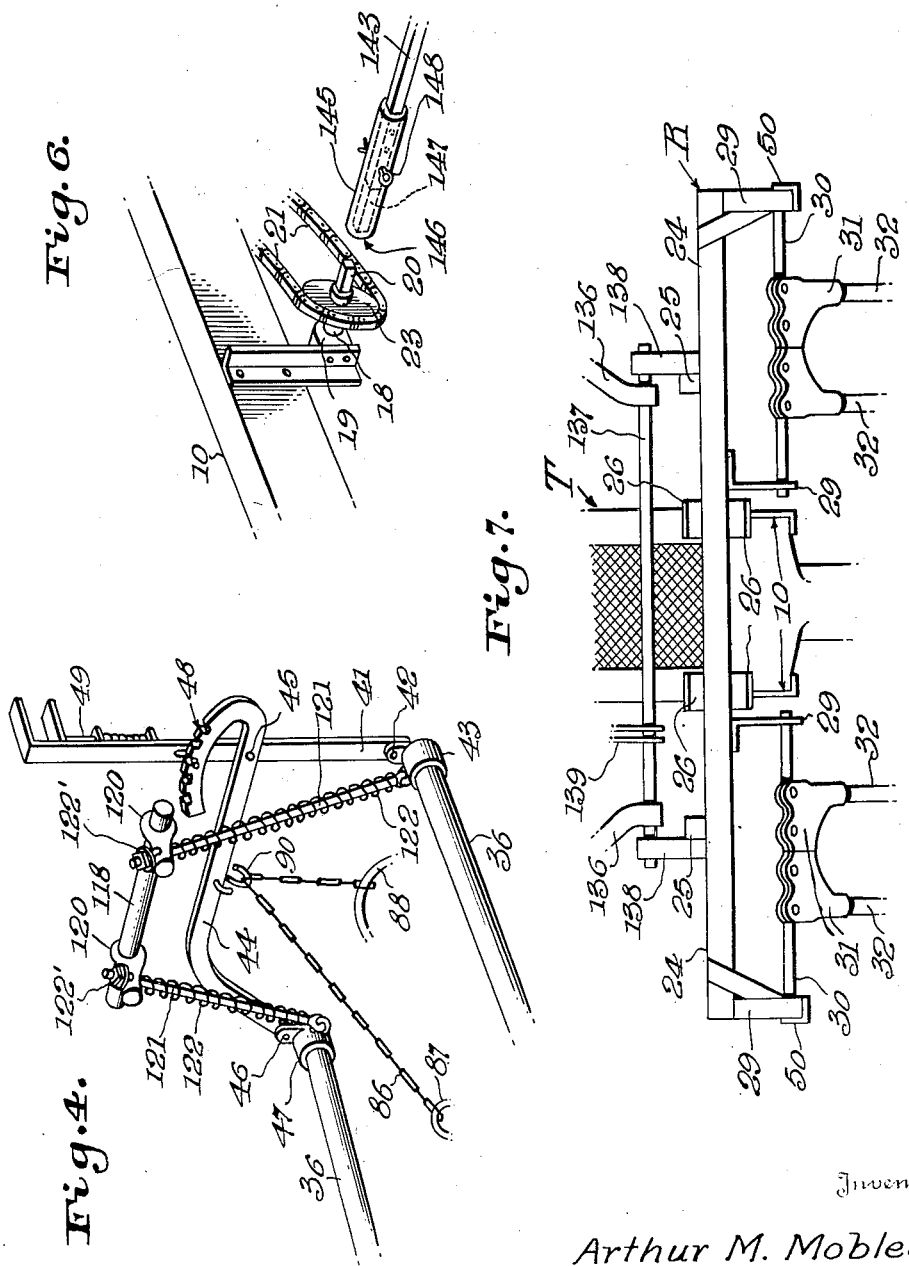
Inventor
Arthur M. Mobley
Baldwin & Wight
Attorneys Patented Feb. 4, 1941

2,230,331

UNITED STATES PATENT OFFICE 2,230,331

PLANTING IMPLEMENT OR ATTACHMENT

Arthur M. Mobley, Hawkinsville, Ga.

Application May 22, 1939, Serial No. 275,096

8 Claims. (Cl. 111—59)

This invention relates to a planting implement or attachment adapted to be removably coupled to, drawn and operated by a tractor.

One prime object is to provide such an implement or attachment as will enable the tractor to be readily driven into and out of hitching relation with respect thereto and has novel means for coupling the distributing parts in firm and efficient driving engagement with novel power take-off structure on a tractor.

It is also aimed to provide in such an implement or attachment, seed discharging mechanism, preferably in association with discharge mechanism for fertilizer, as well as devices operating to open a furrow for reception of the fertilizer and seed, and thereafter cover the furrow.

Other objects are to provide novel means whereby the different devices forming the planting gangs may be adjusted relatively to each other, particularly as to elevation for most effective coaction and operation, wherein such gangs are disposed on each side of the tractor, each gang having means to lift it as a whole, independently of the other gang to clear the soil, as well as means for simultaneously lifting both gangs to clear the soil, and the more specific objects and advantages will, in part, be pointed out and otherwise appear in the following description considered in connection therewith. One operative embodiment is shown by way of example in accompanying drawings.

In said drawings:

Figure 2 is a plan view of the parts of Figure 1;

Figure 3 is a perspective view particularly showing one of the auxiliary frames of a planter gang;

Figure 4 is a perspective view of portions of one pair of gang bars or rods and their adjusting means;

Figure 5 is a plan view of one of the planter gangs;

Figure 6 is a detail perspective view showing, detached, the drive from the tractor countershaft to one of the seeding and fertilizing devices, and Figure 7 is a front elevation, fragmentarily showing the implement or attachment in connection with a tractor.

Figure 1:
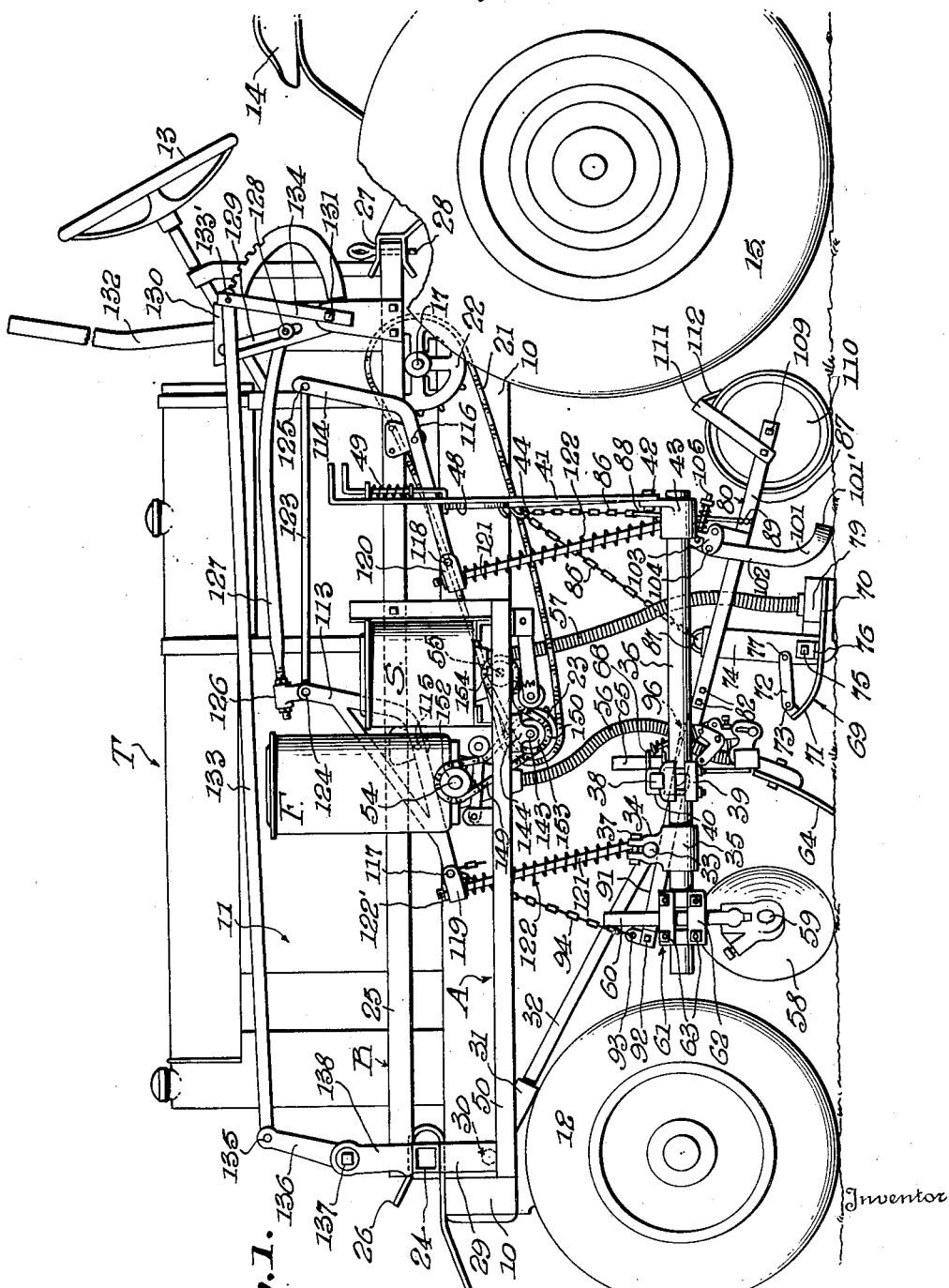
Figure 1 is a side elevation showing my improved implement or attachment coupled to a tractor.

Referring specifically to the drawings, wherein like reference characters designate like or similar parts throughout the different views, the invention has been shown and will be described in connection with a tractor T. This tractor, by way of example, is of conventional form having a narrow chassis of which 10 are longitudinal side beams or sills carrying a prime mover 11 and other usual equipment and essentials. A pair of relatively close steering wheels 12 are mounted at the front of the tractor and are under control of mechanism operable by a steering wheel 13 located at the rear of the tractor and accessible to the operator or occupant of a seat 14. At the rear end such tractor has a pair of drive or ground wheels 15 which are spaced materially outward of the respective side beams or sills 10 and whose axle and driving means pass through a housing 16. Adjacent the rear of such tractor, it has a suitably mounted rotatable power take-off shaft 17, in driving relation, under clutch control, with the prime mover 11.

In order to accommodate and drive the rotary parts of my implement or attachment, a countershaft 18 is journaled in bearings 19 fastened on the sills 10, in parallelism to the power take-off shaft 17 and arranged with its ends 20 free and projecting beyond the respective sills 10, such ends being polygonal or otherwise non-circular in cross section (Figures 2 and 6). The countershaft 18 is driven from the shaft 17 in any suitable manner, as by means of a sprocket chain 21 traversing sprocket wheels 22 and 23, respectively, keyed to shafts 17 and 18.

Coming now to specific consideration of the attachment or implement of the present invention, it comprises similar gangs generally designated A disposed on opposite sides of the tractor. Such gangs are connected together by or suspended from a rigid frame R consisting in parts of a cross beam 24 at the front thereof and longitudinal beams 25, the latter being on opposite sides of the tractor. The attachment or implement is constructed to maintain an erect position of itself or to be capable of temporary support in such a position while the tractor T is driven relatively to the implement or attachment in attaching or detaching the latter.

When the tractor is driven into the implement, cross beam 24 enters a pair of clevises 26 mounted on sills 10 or other parts of the tractor chassis, and the rear ends of longitudinal beams 25 enter clevises 27 also mounted on the tractor, for instance, housing 16. Pins 28 may be passed through registering openings in said clevises 26 and 27 and adjacent beams, especially being desirable at the latter, as shown.

Pairs of brackets 29 (Figure 7) depend from cross beam 24 and the innermost brackets 29 are relatively close to the sills 10 so as to fit the tractor and prevent undesired relative lateral movement between the attachment and tractor.

Each pair of brackets 29 mounts a suspension rod 30 below and in parallelism to cross beam 24. Pivoted or journaled on each suspension rod 30 is a pair of brackets 31 rigid with drag bars 32, a pair of such drag bars being associated with each gang A. The lower ends of drag bars 32 are angularly disposed in an outward direction to form journals 33 which are pivotally mounted in split clamp members 34 of couplings 35, adjustably carried on parallel gang rods or bars 36. If desired, the clamps 34 may be tightened about the journals 33 through manipulation of nuts on bolts 37, associated with such clamps. The gang bars 36 of each gang A are connected together by a cross bar 38, adjustably clamped thereto by means of plates 39 and U-bolts 40. The bolts 40, when loosened, enable the gang bars 36 of each pair to be moved different distances apart and such movement may be effected through manipulation of a lever 41 pivoted at 42 to a collar 43 fastened on one of the gang bars. A link 44 is pivoted at 45 to said lever 41 and is pivoted at 46 to a collar 47 fastened on the companion gang bar 36. Link 44 adjacent the lever 41 terminates in a toothed quadrant 48. The movement of the gang bars is effected through the movement of lever 41 and link 44 relatively and they are secured together against displacement through the coaction of conventional spring-pressed latch mechanism 49, with the teeth of quadrant 48.

On the main frame R of the attachment are side beams 50 which extend rearwardly from the outermost brackets 29, in parallelism to the longitudinal beams 25, such side beams and longitudinal beams being rigidly joined by transverse frame members 51 at the rear ends of the side bars. Mounted in any suitable way on the frame as at beams 25—50 and diagonal beams or supports 50' are fertilizer distributing hoppers or containers F and in the rear thereof are seed containers or hoppers S. These devices F and S are of conventional construction and hence, do not require specific description. The fertilizer distributor F has a conventional distributing or discharge valve mechanism which is controlled through the rotation of a shaft 54 suitably journalled at the base thereof while the seed container or distributor S has a conventional distributing mechanism or valve controlled through the rotation of a shaft 55 journaled on its base.

The fertilizer in the hopper F is discharged through a tube 56 while the seed distributed by the hopper S is discharged through a tube 57. Said tubes 56 and 57 are suspended from their respective hoppers or bases thereof, and they are preferably of a metallic construction enabling flexure and adjustment.

At the forward ends of the gang bars 36, are soil engaging disks 58 which are journaled for rotation on stub axles 59 carried by standards 60 which are secured at any desired height or angle to the adjacent gang bars 36 by means of clamps 61, of any suitable form, for instance, having parts 62 adjustably secured against the standards 60 by means of bolts 63. Such disks are preferably adjusted so as to operate in the soil at the angles shown in Figure 2.

Reverting to the cross bar 38, it carries a shovel 64 of suitable shape, which may be fastened to a post or standard 65, removably and adjustably connected to bar 38 by means of U-shaped bolts 66 associated with clamp plates 67 and 68 directly engaging the bar 38. The fertilizer discharge tube 56 terminates at its lower end in the rear of and relatively close to the shovel, in order that the fertilizer will enter the furrow provided by the shovel 64 in the soil.

Disposed directly behind and in line with the shovel 64 and fertilizer discharge tube 56 is a suitable planting device generally designated 69. This planting device 69 has a runner or shoe 70 adapted to slide over the soil and its forward edge is preferably deflected upwardly as at 71. Links 72 are pivoted thereto as at 73. A standard or post 74 is adjustably secured to the runner 70 through the binding engagement of screws 75 threaded to angle brackets 76. Links 72, at their rear ends, are pivoted at 77 to the standard 74 and adjustment of the latter is accommodated by a slot 78 in the shoe 70. The shoe 70 carries a guide member 79 at the rear thereof in which the lower end of discharge tube 57 terminates, in longitudinal alinement with the shovel and tube 56, in order to discharge seed in the furrow before closing thereof after the deposit of fertilizer therein.

Each pair of gang bars 36 carries an auxiliary frame 80 as best seen in Figures 3 and 5. Each auxiliary frame 80 consists of a pair of rear parallel bars 81 riveted at 82 to intermediate bars 83, having inwardly extending rear terminal portions 84 fastened as at 85 to the upper end of the standard 74 of the adjacent planting device 69. A chain or the equivalent 86 is tethered to a staple 87 at the upper end of each standard 74 and to a bail 88 having terminals 89 pivoted in openings of the bars 81. Chains or flexible elements 86 may be adjusted so as to vary the position of the planting devices with respect to the soil, through the engagement of one or more of the links thereof with a hook 90 attached to the aforesaid link 44, or other suitable part, as shown best in Figure 3.

Each auxiliary frame 80 further includes a pair of forward bars 91 bolted together as at 92 with the bolt securing a lug 93 thereto from which a chain 94 extends and which at its upper end engages a hook 95. Bars 91 at their rear ends, have laterally extending lugs 96 which overlap the upper edges of bars 83. The bars 83 and 91 by means of bolts or the like 97 are pivoted to angle brackets 98 which are clamped by means of plates 99 and bolts 100, rigidly to the cross bar 38.

Said bars 81 carry conventional furrow-coverers 101 having lower curved or sweep portions 101' to engage the soil and arms 102 pivoted to brackets 103 on bars 81 at 104. Extending from the upper ends of arms 102 are bolts 105, which slide through enlarged openings in guide lugs 106 on the brackets 103. Nuts or other abutments 107 are carried by bolts 105 and expansive coil springs 108 surround the bolts 105 and at opposite ends, abut lugs 106 and abutments 107. Springs 108 normally maintain the coverers 101 operatively engaged with the soil, but they permit pivotal yielding of the latter against the tension of the springs 108, in the event an undue obstruction is encountered.

Said bars 81 mount an axle 109 at the rear thereof on which soil press wheels 110, are journaled. Such wheels 110 press the soil in line behind the coverers 101, but directly press the soil filled into the furrow only adjacent the sides of the latter, thus not unduly compacting the soil in line with the planted seed. An arched bracket 111 fastened to the bars 81, extends over the press wheels and has a blade 112 disposed in soil-clearing relation to the peripheries of the press wheels 110.

Each gang A is capable of raising as a whole against the tension of spring means should an undue obstruction be encountered during planting and each of the gangs A are capable of being adjusted or lifted, either together or independently, above the soil or to any depth of operation. To this end, a pair of angle levers 113 and 114 for each gang of implements A (Figure 1) is pivoted as at 115 and 116, respectively, to the adjacent longitudinal beam 25 and each of said levers consists of a plurality of bars straddling such beam 25 as shown. Rods 117 and 118 are mounted in the lower ends of said levers and they carry a pair of guide couplings 119 and 120, respectively, in which suspending rods 121 are slidably retained by removable fastenings 122' resting on the levers. Hook 95 is carried by rod 117, as best shown in Figure 3. The forward two rods 121 for each gang are pivotally connected to the couplings 35 and the rear two rods 121 of each gang are pivotally connected to the adjacent collars 43 and 47 (Figures 4 and 5). Expansive or cushioning coil springs 122 surround the rods 121 and hold the gangs A to their adjusted position and against vertical yielding except when undue obstructions may be encountered when the rods 121 may slide in the guide couplings 120 against the tension of the springs 122. A link 123 is pivotally joined to levers 113 and 114 at 124 and 125, respectively, and one bar of lever 113 has an extension 126 from which an elongated arm 127 extends rearwardly and which is pivotally and slidably connected at 128 in a slot 129 of a generally triangular plate 130 pivoted at 131 on the adjacent longitudinal beam 25. Said plate 130 and associated parts are a movement multiplying device not forming a specific part of the present invention and, hence, will not be described in detail. However, an operating lever 132 and associated latching mechanism is provided for such device and a link 133 is pivoted at 133' to a crank 134 on pivot 131 and at 135 to a crank 136 rigid on a transverse rock shaft 137 journaled in upstanding bearings 138 rigid on the cross beam 24. Thus by means the linkage described, operation of the levers 132 will effect raising or lowering of the gang with which it is associated.

The hooks 95 attached to chains 94 are adapted to be suspended on the rods 117. Another crank 139 is rigid on rock shaft 137 and a link 140 is pivoted thereto at 141. Link 140 extends rearwardly and belongs to a mechanism specifically forming no part of the present invention. It is operable, however, either manually or from a driven part 142 of the tractor, or by a combination of manual and power drive to sufficiently swing the crank 139, rock shaft 137 and through links 133 and their connections to the gangs, will simultaneously lift both gangs.

Reverting to the shafts 54 and 55 which, respectively, control the fertilizer discharge mechanism and seed discharge mechanism, the operating power therefor is derived from the previously described countershaft 18 on the tractor T. To this end, each gang has a transverse operating shaft 143 alined with countershaft 18 and journaled in bearings 144 on the main frame.

On the inner end of each operating shaft 143, a coupling sleeve 145 is slidable so as to be movable into and out of engagement with the adjacent portions 20 of the countershaft 18. Coupling sleeves 145 at 146 have sockets 147 conforming to the non-circular contour of the portions 20. Cotter keys or other fastenings 148 may be removably passed through adjacent openings in sleeves 145 and the shafts 143 to hold such sleeves in coupled position.

Any suitable gearing may be used to operate the shafts 54 and 55 from shafts 143. As shown best in Figures 1 and 2, this gearing employs sprocket chains 149 and 150. Chain 149 is trained over sprocket wheels 151 and 152, respectively keyed on adjacent shafts 143 and 54 while chain 150 traverses sprocket wheels 153 and 154, respectively keyed on adjacent shafts 143 and 55.

To briefly trace the operation, the implement or attachment constituting the present invention will be drawn or pushed along by the tractor T since it is hitched thereto by means of cross bar 24 and coacting clevises 26 and by means of longitudinal beams 25 pinned at 28 to clevises 27. The sleeves 145 are coupled to ends 20 of countershaft 18 by means of keys 148 so that the valve or discharge shaft 54 of the fertilizer distributer F and valve or discharge shaft 55 of the seed distributer S will be operated by the chains and sprockets 149—154 from shafts 143 which are driven from the power take-off shaft 17 through sprocket 22, chain 21 and sprocket 23.

As the tractor advances, disks 58 and shovels 64 of each gang A penetrate the soil so as to provide a furrow which first receives fertilizer discharged at the proper time from distributer F under control of shaft 54 through tube 56 and which furrow then receives seed discharged from distributer S under control of shaft 55 through tube 57. Following deposit of the fertilizer and seed in the furrow, the soil which was removed to provide the furrow, is returned to the furrow over the fertilizer and seed by the coverers 102, following which the press wheels 110 engage and sufficiently compact the returned soil on each side of the longitudinal plane in which the seeds were deposited and planted, thus avoiding too tightly compacting the soil over the seed.

The gangs may yield as a whole against the action of springs 122, upon encountering undue obstructions, and the coverers 102 may yield independently against the tension of springs 108.

By means of the mechanisms heretofore traced, the gangs A may be simultaneously lifted to clear the ground through operation of the means 142 while the gangs A may be separately, independently or relatively lifted and adjusted by manipulating the levers 132.

Pivots 97 in combination with chains 86 and 94 enable adjustment of the position and angle of the frames 80.

Various changes may be resorted to provided they fall within the spirit and scope of the invention.

What is claimed is:

1. An agricultural implement having a main frame for attachment to a tractor, laterally spaced apart gang bars, simultaneously operable levers pivoted on said main frame, spaced apart suspension rods depending from said levers and attached to said gang bars, an auxiliary frame, means flexibly connecting the auxiliary frame and gang bars, furrow-opening tools carried by the gang bars, a dispenser on the main frame, gearing on the main frame to operate the dispenser from the tractor, a planting attachment on the auxiliary frame behind said tools and in the line of discharge from the dispenser, and furrow-closing means on the auxiliary frame in the rear of said planting attachment.

2. An agricultural implement having a main frame provided with longitudinal beams for attachment to a tractor, a beam on said main frame below and outwardly of said longitudinal beams, laterally spaced apart gang bars, levers pivoted to the longitudinal beams, means to operate the levers, means suspending the gang bars from the levers, an auxiliary frame pivoted to the gang bars, a furrow-opening shovel carried by the gang bars, a seed dispenser on the second mentioned beam operative to discharge behind the shovel, means mounted on the second mentioned beam adapted for operation from the tractor to operate said dispenser, a planting attachment on the auxiliary frame behind said shovel and in the line of discharge from the seed dispenser, and furrow-closing means on the auxiliary frame in the rear of said planting attachment.

3. An agricultural implement having a main frame for attachment to a tractor, gang bars, means suspending the gang bars from the main frame, an auxiliary frame pivotally connected intermediate its ends to the gang bars, a flexible suspending element extending from the main frame to the front of the auxiliary frame, connecting means for the gang bars, a flexible suspending element on the side of the pivotal axis of the auxiliary frame opposite to the first flexible suspending element, said second flexible suspending element being connected to the main frame and auxiliary frame, furrow-opening means carried by the gang bars, a dispenser on the main frame adapted for operation from the tractor, a planting attachment on the auxiliary frame behind said furrow-opening means and in the line of discharge from the dispenser, and furrow-closing means on the auxiliary frame in the rear of said planting attachment.

4. An agricultural implement having a main frame for attachment to a tractor, gang bars in laterally spaced relation, means suspending the gang bars from the main frame, members pivotally connected together and connected to the gang bars operable to secure the gang bars in different adjusted positions, an auxiliary frame pivotally connected to the gang bars, a suspending element extending from one of said members to the auxiliary frame at the rear of the pivotal axis of the latter, furrow-opening means carried by the gang bars, a dispenser on the main frame adapted for operation from the tractor, a planting attachment on the auxiliary frame behind said furrow-opening means and in the line of discharge from the dispenser, and furrow-closing means on the auxiliary frame in the rear of said planting attachment.

5. An agricultural implement having a main frame for attachment to a tractor, laterally spaced apart gang bars, means suspending the gang bars from the main frame, a furrow-opening means carried by the gang bars, a dispenser on the main frame operative to discharge behind the furrow-opening means, means adapted for operation from the tractor to operate said dispenser, a planting attachment, an auxiliary frame having front, intermediate and rear bars, means pivoting said front bars to the gang bars and intermediate bars, lugs on the front bars rearwardly of the pivotal axis of such bars overlapping the intermediate bars from above, members securing the intermediate and rear bars together, said intermediate bars extending inwardly beyond said members and mounting said planting attachment behind said furrow-opening means in the line of discharge from said dispenser, and furrow-closing means on the rear bars behind said planting attachment.

6. An agricultural implement having a main frame for attachment to a tractor, laterally spaced apart gang bars, means suspending the gang bars from the main frame, a furrow-opening means carried by the gang bars, a dispenser on the main frame operative to discharge behind the furrow-opening means, means adapted for operation from the tractor to operate said dispenser, a planting attachment, an auxiliary frame having front, intermediate and rear bars, means pivoting said front bars to the gang bars and intermediate bars, lugs on the front bars rearwardly of the pivotal axis of such bars overlapping the intermediate bars from above, members securing the intermediate and rear bars together, said intermediate bars extending inwardly beyond said members and mounting said planting attachment behind said furrow-opening means in the line of discharge from said dispenser, members pivotally connected together and to the gang bars operable to secure the gang bars in different adjusted positions, a suspending element connected to the auxiliary frame adjacent said planting attachment and to a rear bar, a device on one of the last mentioned members adjustably engageable by the suspending element, and furrow-closing means on the rear bars behind said planting attachment.

7. An agricultural implement according to claim 5 wherein the furrow-closing means comprises furrow-coverers pivoted to the rear bars, yieldable spring-controlled means positioning said coverers, and press wheel means carried by the rear bars in the rear of said coverers.

8. An agricultural implement having a main frame for attachment to a tractor, gang bars in laterally spaced relation, draft couplings on the gang bars, collars on the gang bars rearwardly of the couplings, connected levers on the main frame, suspension rods slidably mounted by the levers and attached to said couplings and collars respectively, cushioning springs on said rods, members pivotally connected together and to the collars operable to secure the gang bars in different adjusted positions, a furrow-opening means carried by the gang bars, distributers on the main frame operative to discharge fertilizer and seed behind the said means, means adapted for operation from the tractor to operate said dispensers, a planting attachment, an auxiliary frame having front, intermediate and rear bars, means pivoting said front bars to the gang bars, a flexible suspending element connected to the main frame and said front bars, lugs on the front bars rearwardly of the pivotal axis of such bars overlapping the intermediate bars from above, members securing the intermediate and rear bars together, said intermediate bars extending inwardly beyond said members and mounting said planting attachment behind said furrow-opening means in the line of discharge from said dispensers, a flexible suspending element connected to the auxiliary frame adjacent said planting attachment and to a rear bar, a device on one of the members adjustably engageable by the second mentioned flexible suspending element, furrow-coverer means carried by the rear bars operative behind said planting attachment, and press wheel means carried by the rear bars in the rear of said coverer means.

ARTHUR M. MOBLEY.